(12) United States Patent
Frasch et al.

(10) Patent No.: US 7,946,377 B2
(45) Date of Patent: May 24, 2011

(54) SUBFRAME FOR A REAR AXLE OF A MOTOR VEHICLE

(75) Inventors: Wilhelm Frasch, Oberboihingen (DE);
Lutz Bauer, Boeblingen (DE);
Reinhard Kunert, Weissach (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 73 days.

(21) Appl. No.: 12/390,867

(22) Filed: Feb. 23, 2009

(65) Prior Publication Data
US 2009/0212548 A1 Aug. 27, 2009

(30) Foreign Application Priority Data

Feb. 22, 2008 (DE) .................. 10 2008 010 551

(51) Int. Cl.
*B62D 21/02* (2006.01)
(52) U.S. Cl. .................. 180/312; 280/124.109
(58) Field of Classification Search .................. 180/312, 180/377, 378, 383, 384, 385; 280/124.109, 280/124.156, 781, 785, 788, 790, 791, 792, 280/795, 796, 797, 798, 799, 800; 296/204, 296/205
See application file for complete search history.

(56) References Cited

U.S. PATENT DOCUMENTS

| | | | |
|---|---|---|---|
| 5,074,587 A | | 12/1991 | Schwede et al. |
| 5,280,957 A | | 1/1994 | Hentschel et al. |
| 5,417,454 A | * | 5/1995 | Adams .......................... 280/794 |
| 6,269,902 B1 | * | 8/2001 | Miyagawa .................... 180/312 |
| 6,357,769 B1 | | 3/2002 | Omundson et al. |
| 6,398,262 B1 | * | 6/2002 | Ziech et al. .................... 280/785 |
| 6,511,096 B1 | | 1/2003 | Kunert et al. |
| 6,623,020 B1 | | 9/2003 | Satou |
| 6,742,808 B1 | * | 6/2004 | Kosak ........................... 280/781 |
| 6,843,524 B2 | | 1/2005 | Kitagawa |
| 7,229,098 B2 | * | 6/2007 | Mangalaramanan et al. 280/781 |
| 2002/0140220 A1 | * | 10/2002 | Tatsumi et al. ............... 280/781 |
| 2006/0049603 A1 | | 3/2006 | Katagiri et al. |
| 2007/0024044 A1 | | 2/2007 | Ogawa et al. |

FOREIGN PATENT DOCUMENTS

| | | |
|---|---|---|
| DE | 3905650 C1 | 1/1990 |
| DE | 41 29 538 C2 | 3/1993 |
| DE | 199 22 800 A1 | 11/1999 |

(Continued)

OTHER PUBLICATIONS

German Patent and Trademark Office Search Report, dated Oct. 1, 2008.

(Continued)

*Primary Examiner* — Paul N Dickson
*Assistant Examiner* — Joseph Rocca

(57) ABSTRACT

The subframe contains a framework which is cast as a single part and has profiled hollow members for the longitudinal and cross members. The cross members are connected to each other via supporting pillars at the corners, or are integrally formed on the supporting pillars. Arms which protrude outward are integrally formed on the supporting pillars or on the longitudinal and cross members, the end sides of which arms have connecting bearings toward the vehicle body. A differential is held on the two cross members, the differential having one mounting on the front cross member and two mountings on the rear cross member. The longitudinal members have a curved passage opening for the drive shafts of the differential. Mountings for wheel guiding links are arranged on the outside of the longitudinal member.

8 Claims, 5 Drawing Sheets

FOREIGN PATENT DOCUMENTS

| | | |
|---|---|---|
| DE | 199 09 945 C1 | 10/2000 |
| DE | 10059261 A1 | 7/2001 |
| DE | 102004012662 A1 | 10/2005 |
| DE | 102004016188 A1 | 10/2005 |
| DE | 10 2005 033 814 A1 | 2/2007 |
| DE | 102006013548 A1 | 10/2007 |
| JP | 2005280651 A | 10/2005 |

OTHER PUBLICATIONS

German Search Report dated Sep. 11, 2009.
European Search Report dated Sep. 9, 2009.

* cited by examiner

SUBFRAME FOR A REAR AXLE OF A MOTOR VEHICLE

CROSS-REFERENCE TO RELATED APPLICATION

This application claims the priority, under 35 U.S.C. §119, of German application DE 10 2008 010 551.1, filed Feb. 22, 2008; the prior application is herewith incorporated by reference in its entirety.

BACKGROUND OF THE INVENTION

Field of the Invention

The invention relates to a subframe for a rear axle of a motor vehicle. The subframe has two cross members, which are spaced apart from each other, between two longitudinal members, and the end sides of the longitudinal members each have connecting bearings toward the vehicle body. A differential is held on the cross members, and the longitudinal members have link bearings for wheel guiding elements.

German patent DE 199 09 945 C1, corresponding to U.S. Pat. No. 6,511,090, discloses a subframe for a rear axle of a motor vehicle. The subframe contains a framework which is fastened to the vehicle body and has cross members and longitudinal members connected to the latter. A transmission unit is mounted between the longitudinal members and cross members, and mountings for wheel guiding elements are provided on the longitudinal members. Furthermore, Japanese patent JP 64-40773 discloses a subframe which has longitudinal members and cross members, and connecting bearings toward the vehicle body are arranged at the free ends of the longitudinal members.

SUMMARY OF THE INVENTION

It is accordingly an object of the invention to provide a subframe for a rear axle of a motor vehicle that overcomes the above-mentioned disadvantages of the prior art devices of this general type, which subframe is configured such that it is light in terms of weight and is nevertheless stable in terms of strength, and can be fitted into the vehicle in a simple manner in the form of a preassembled unit together with wheel suspensions and with a differential.

With the foregoing and other objects in view there is provided, in accordance with the invention, a subframe for a rear axle of a motor vehicle. The subframe contains a framework cast as a single part and has corners. The framework contains profiled hollow members including: two longitudinal members containing link bearings for wheel guiding elements and end sides each having connecting bearings toward a vehicle body; and two cross members being spaced apart from each other, between the two longitudinal members, the cross members provided for supporting a differential. Connecting bearings and supporting pillars are disposed at the corners of the framework. Each of the longitudinal members has a curved passage opening between the supporting pillars. On the supporting pillars, the end sides of the longitudinal members and the cross members are integrally formed. The supporting pillar contains arms integrally formed thereon in a protruding manner for the connecting bearings. The cross members include a front cross member disposed between the supporting pillars and have—with respect to a direction of travel—a curved rounded portion with a bearing receptacle for the differential, and a rear cross member disposed between the supporting pillars and have a rectilinear extent.

The advantages primarily obtained with the invention are that the framework which is produced in a single-part configuration, for example by casting, obviates the need for any welds and other types of connection associated with the disadvantages of distortion and finishing work. In addition, all of the bearing receptacles are advantageously integrally formed at the same time, and therefore the bearing receptacles only have to be subjected to machining for dimensional accuracy. In particular, each longitudinal member of the subframe has a curved passage opening between supporting pillars at the corners of the framework, on which supporting pillars the end sides of the longitudinal members and cross members are integrally formed, and the supporting pillars have outwardly protruding arms with the connecting bearings. The front cross member between the supporting pillars has a curved rounded portion with a bearing receptacle for a differential, and the rear cross member between the supporting pillars has a rectilinear extent. The supporting pillars provide stable connecting points toward the vehicle body, in which connecting points the longitudinal members and cross members are connected optimally in terms of strength.

The connecting bearings are arranged at the respective free ends of the arms on the supporting pillars of the framework, with the two front connecting bearings being arranged in a lower horizontal plane than the two other, rear connecting bearings which lie in a higher horizontal plane. This permits adaptation of the connecting bearings to the circumstances of the vehicle body.

A reinforcing junction element for the bearing receptacle for a front region of the differential is arranged in the curved rounded portion of the front cross member, and a further bearing receptacle for a mounting on both sides of the rear region of the differential is arranged in each case between the rear cross member and the supporting pillars. The bearing receptacle is embedded between side walls within the front cross member, wherein the junction element of the bearing receptacle has outer, profile-forming impressions molded into the cross member on both sides of the bearing receptacle. This results in a stable mounting of the differential, in which the bearing is supported by side walls of the cross member.

The rear cross member is integrally formed in a lower region of the supporting pillars of the framework, and the protruding arms for the connecting bearings are connected to the supporting bearings as an extension of the cross member. An optimum strength bond between the supporting pillars and the cross member is therefore produced, with the cross member having a rectangular cross section which is oriented with the edge uppermost between the supporting pillars.

Other features which are considered as characteristic for the invention are set forth in the appended claims.

Although the invention is illustrated and described herein as embodied in a subframe for a rear axle of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
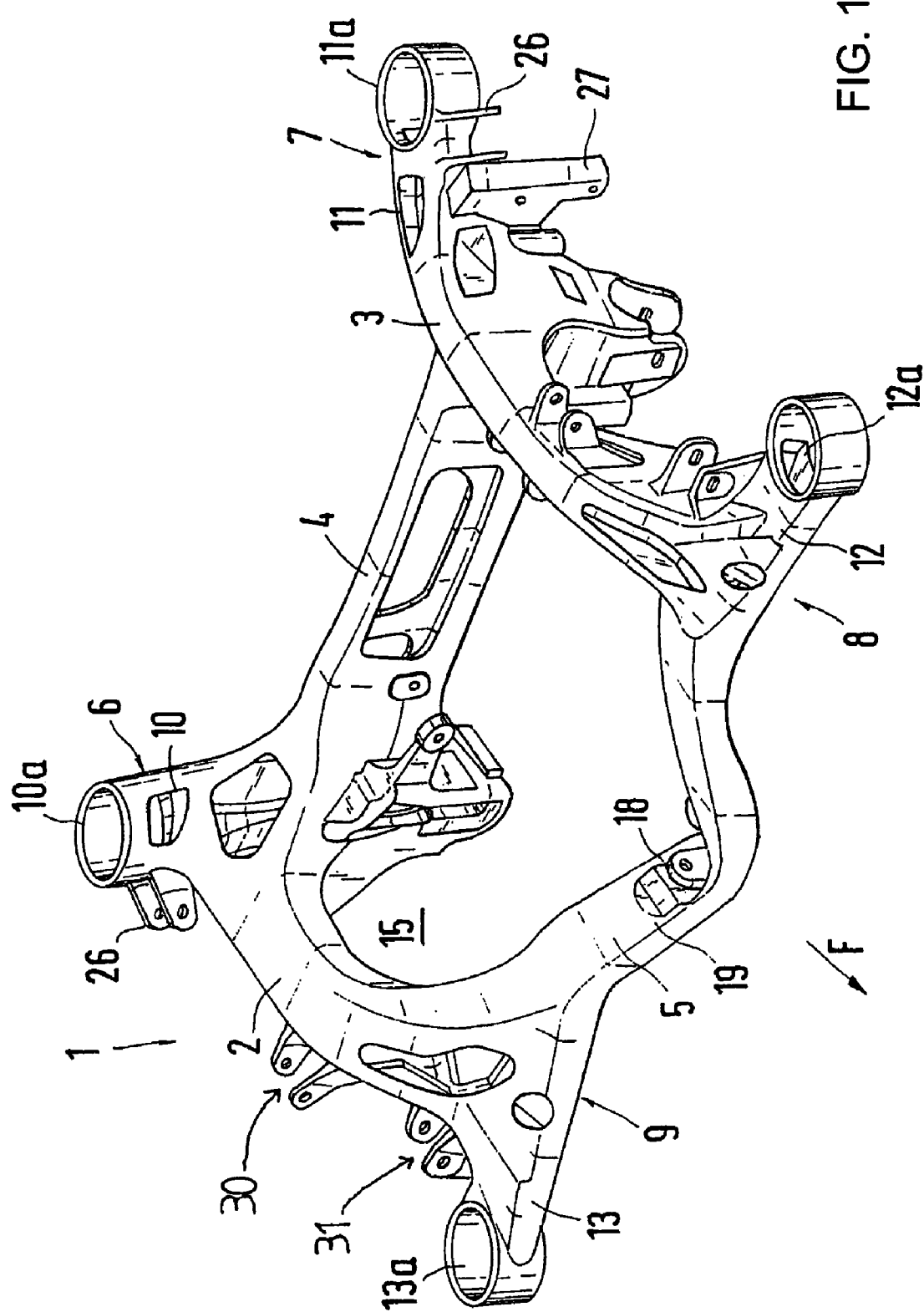
FIG. 1 is a diagrammatic perspective view of a subframe according to the invention.

Referring now to the figures of the drawing in detail and first, particularly, to FIG. 1 thereof, there is shown a subframe 1 that has a framework with two lateral longitudinal members 2, 3 and two cross members 4, 5 which are arranged at a distance from each other and are connected to the longitudinal members 2, 3 via supporting pillars 6, 7, 8 and 9 at the corners, or are integrally formed with the supporting pillars. Protruding arms 10, 11, 12 and 13 have end sides with connecting bearings 10a, 11a, 12a and 13a disposed toward the vehicle body and are connected to the supporting pillars 6-9 (FIG. 2).

Figure 2:
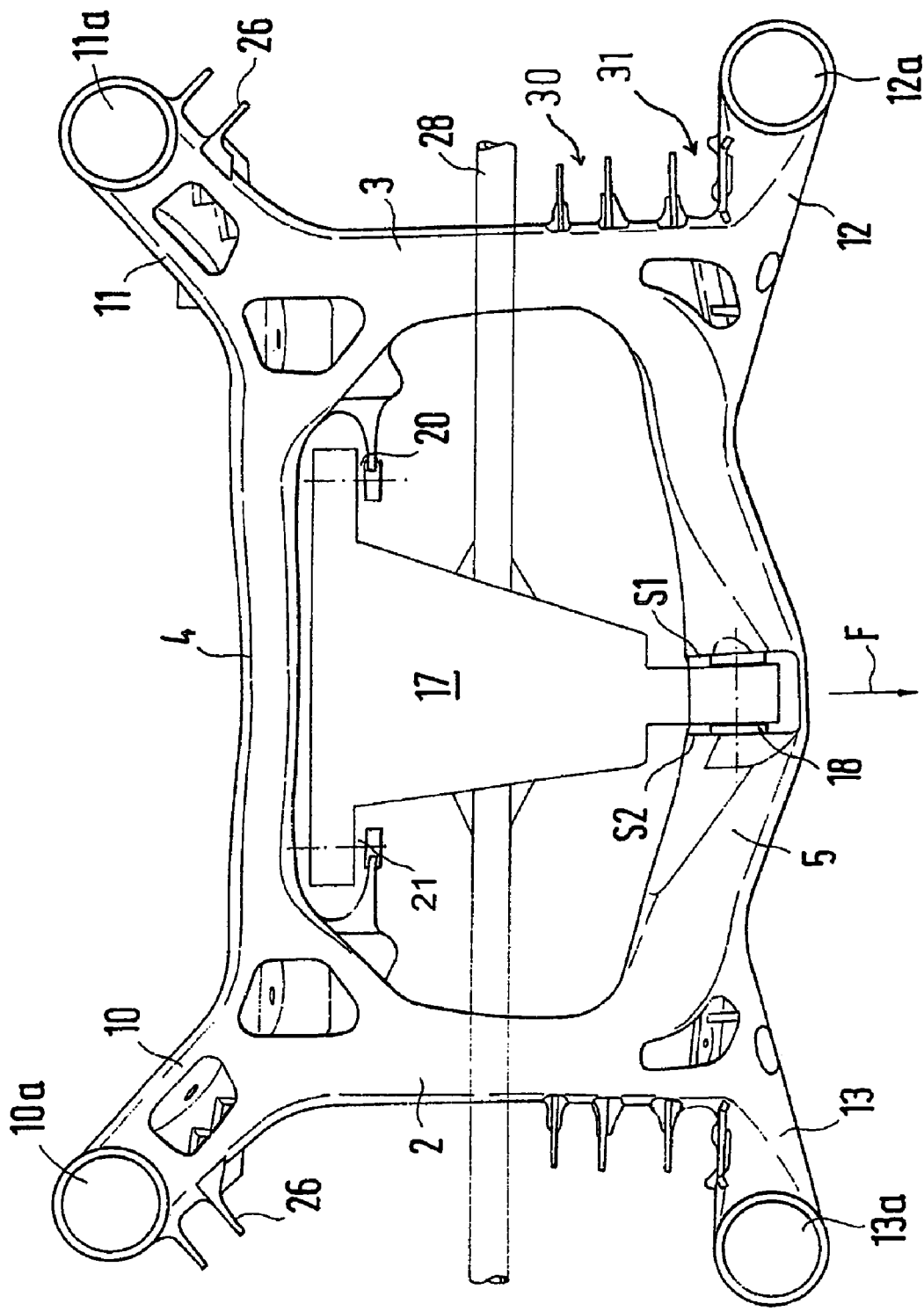
FIG. 2 is a top, plan view of the subframe.
Figure 3:
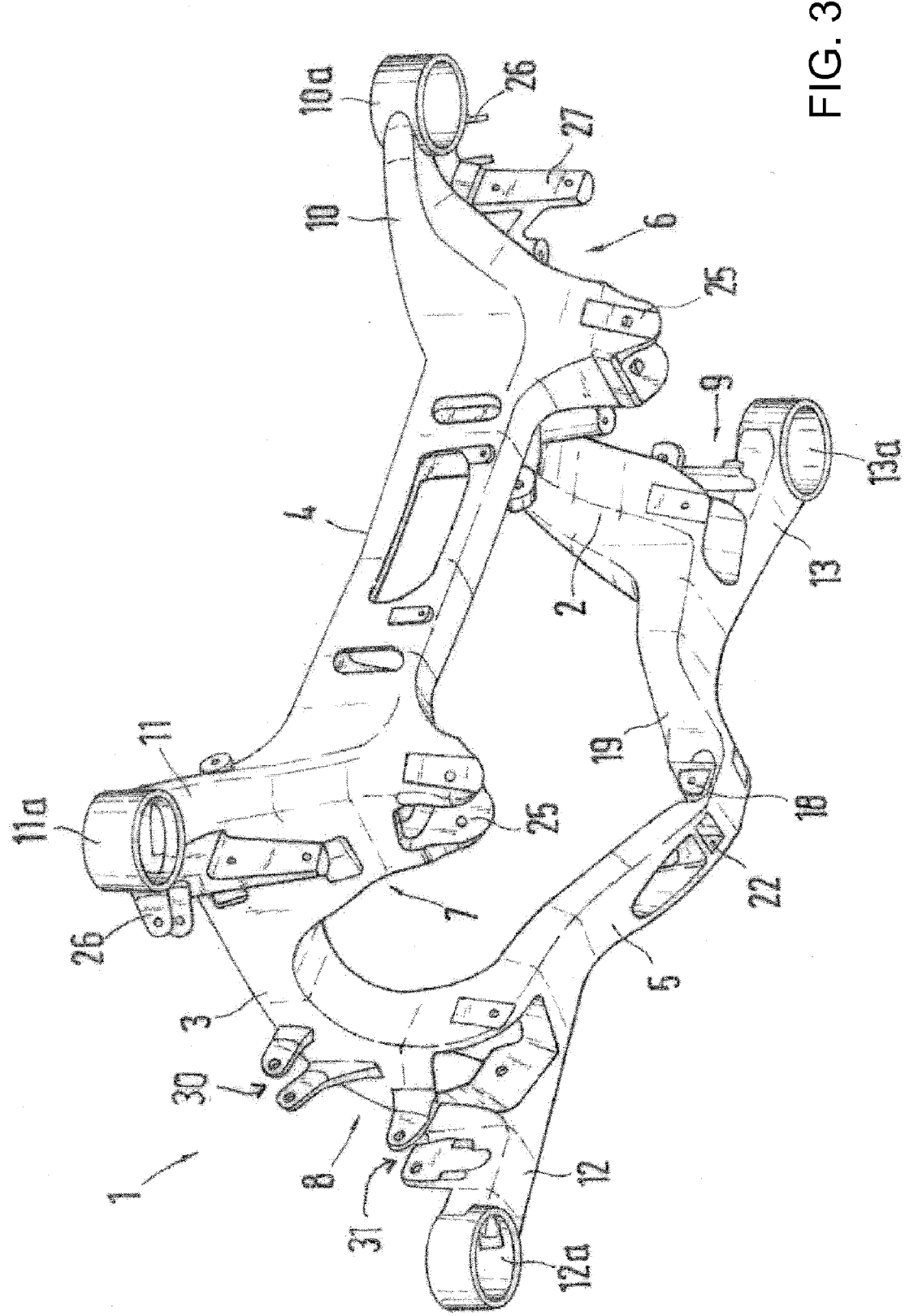
FIG. 3 is a bottom, perspective view of the subframe.

The longitudinal members 2, 3 have a curved passage opening 15 for a shaft 28 of a differential 17 between the respective supporting pillars 6, 9 and 7, 8 (FIGS. 2 and 3). In a curved rounded portion 19, the front cross member 5 has—with respect to a direction of travel F—a bearing receptacle 18 for a front region of the differential 17. A further, rear mounting of the differential 17 is provided in mountings 20, 21 between the rear cross member 4 and the supporting pillars 7 and 6.

The bearing receptacle 18 is provided within the cross member 5 and is embedded between side walls S1 and S2. Profile-forming impressions 22 are molded onto the rear side of the bearing receptacle 18.

Figure 4:
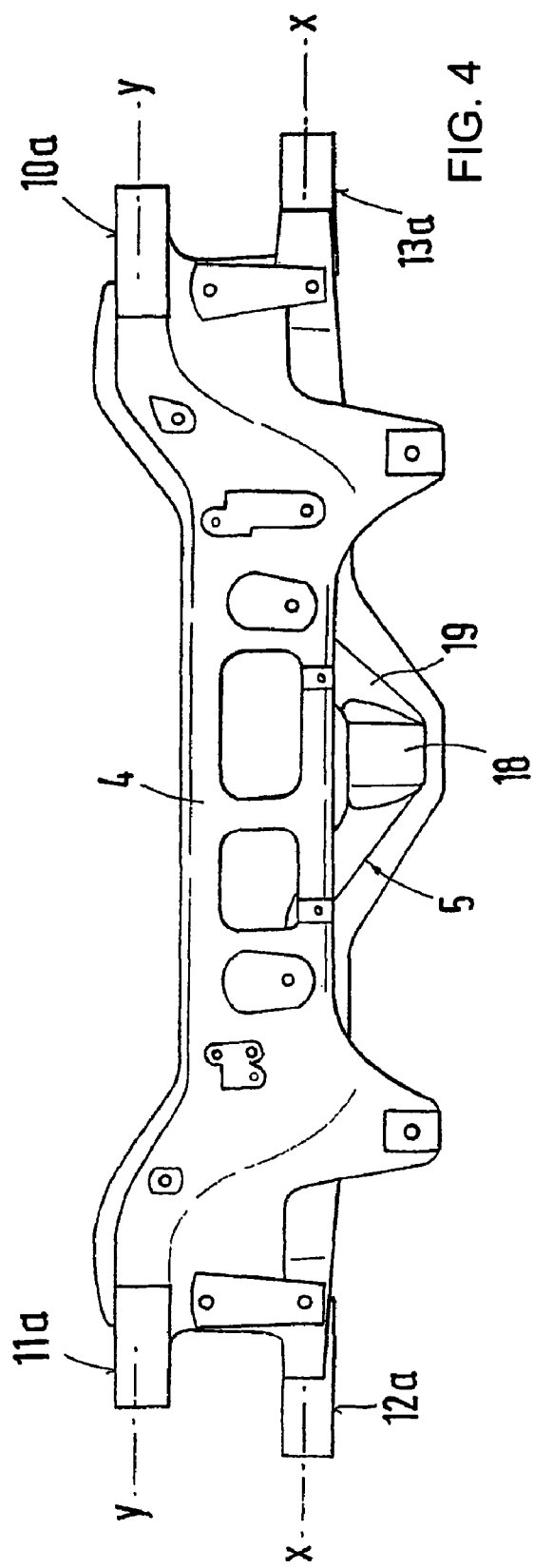
FIG. 4 is rear view of the subframe.
Figure 5:
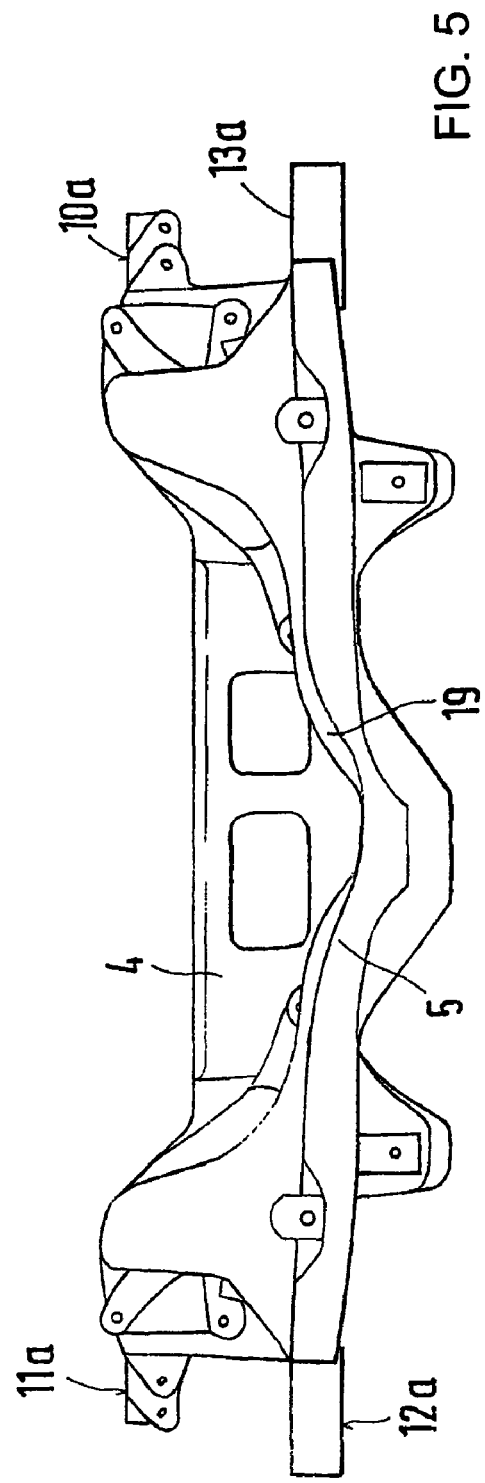
FIG. 5 is a front view of the subframe.
Figure 6:
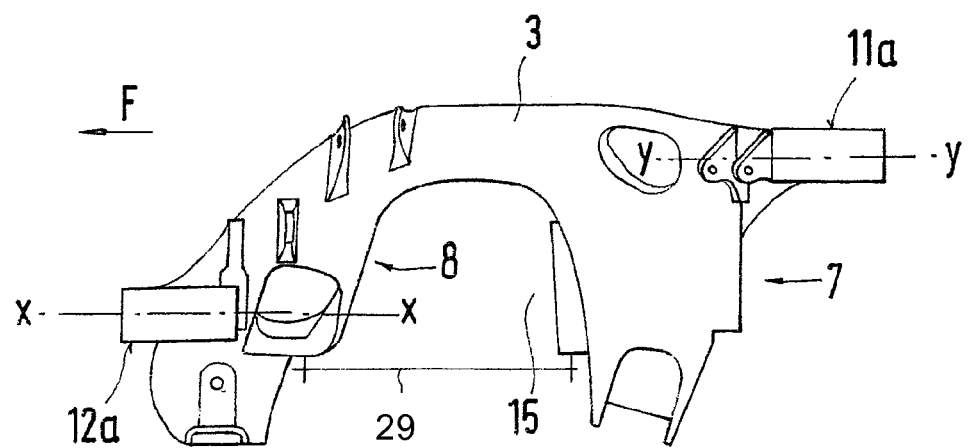
FIG. 6 is a side view of the subframe.

Two front connecting bearings 12, 13 are arranged in a horizontal plane x-x which is positioned lower than the rear connection bearings 10a, 11a, which are arranged in the horizontal plane y-y, in arms 10, 11 of the supporting pillars 6 and 7 (see FIGS. 4-6).

The rear cross member 4 is integrally formed in a lower region of the supporting pillars 6, 7 of the framework, and the arms 10, 11, which protrude to both sides and have the connecting bearings 10a, 11a, are provided as an extension of the cross member 4. The cross member 4 is of a rectangular configuration in cross section and is oriented with the edge uppermost between the supporting pillars 6 and 7.

The supporting pillars 6, 7 between the rear cross member 4 and the adjoining longitudinal members 2, 3 have a respective bearing receptacle 25 for a wheel guiding link at the lower, free end (FIG. 3). At the upper end remote therefrom, a bearing receptacle 26 for a transverse link and a fastening plate 27 for a stabilizer are provided on the protruding arm 10, 11.

Between the supporting pillars 6, 9 and 7, 8, a stiffening bolt 29 can be arranged below the curved passage opening 15.

The subframe has a connection 30 for an upper transverse link and a connection 31 for a track rod.

The invention claimed is:

1. A subframe for a rear axle of a motor vehicle, the subframe comprising:
   a framework cast as a single part and having corners, said framework comprising:
      profiled hollow members including:
         at most two longitudinal members containing link bearings for wheel guiding elements and end sides;
         two cross members being spaced apart from each other, between said two longitudinal members, said cross members provided for supporting a differential;
      connecting bearings and supporting pillars disposed at said corners of said framework, each of said longitudinal members having a curved passage opening formed therein between said supporting pillars, on said supporting pillars, said end sides of said longitudinal members and said cross members are integrally formed, and said supporting pillars containing arms integrally formed thereon in a protruding manner for said connecting bearings;
      said supporting pillars include front supporting pillars and rear supporting pillars;
      said cross members including a front cross member disposed between said front supporting pillars and having—with respect to a direction of travel—a curved rounded portion with a front bearing receptacle for the differential, and a rear cross member disposed between said rear supporting pillars and having a rectilinear extent; and
      said connecting bearings disposed at respective free ends of said arms on said supporting pillars of said framework, said connecting bearings including two rear connecting bearings and two front connecting bearings—with respect to the direction of travel—being disposed in a lower horizontal plane than said rear connecting bearings disposed in a higher horizontal plane, said connecting bearings connecting the subframe to the vehicle body.

2. The subframe according to claim 1, wherein said framework has:
   further rear bearing receptacles for bearings on both sides of a rear region of the differential and disposed in each case between said rear cross member and said supporting pillars.

3. The subframe according to claim 2, wherein:
   said front cross member has side walls; and
   said front bearing receptacle is embedded between said side walls within said front cross member.

4. The subframe according to claim 1, wherein said rear cross member is integrally formed in a lower region of said supporting pillar of said framework, and said arms for said connecting bearings are connected to said supporting pillars as an extension of said rear cross member.

5. The subframe according to claim 1, wherein said supporting pillars between said rear cross member and said longitudinal members have an additional bearing receptacle for a wheel guiding link at a lower end and, in said arms at an upper end which is remote therefrom, have a further bearing receptacle for an upper transverse link and for a fastening plate of a stabilizer.

6. The subframe according to claim 1, wherein the differential is embedded between said longitudinal members and said cross members such that the differential is surrounded thereby, and a respective drive shaft of the differential is passed through said curved passage opening of said longitudinal members.

7. The subframe according to claim 1, wherein said curved passage opening has, on a lower side, a stiffening bolt connected to said supporting pillars.

8. The subframe according to claim 1, wherein said rear cross member has a rectangular cross section and is oriented with an edge uppermost.

* * * * *